United States Patent
Clough et al.

(10) Patent No.: US 7,275,300 B2
(45) Date of Patent: Oct. 2, 2007

(54) PROCESS FOR RAPID ON-DEMAND STATOR REWINDS IN ELECTRICAL GENERATORS

(75) Inventors: Mark Stephen Clough, Schenectady, NY (US); Frank Joseph Garwatoski, Woodstock, GA (US); Craig Alan Wroblewski, Schenectady, NY (US); Jeffery Alan Henkel, New Philadelphia, OH (US); William G. Newman, Scotia, NY (US)

(73) Assignee: General Electric Company, Schenctady, NY (US)

( * ) Notice: Subject to any disclaimer, the term of this patent is extended or adjusted under 35 U.S.C. 154(b) by 416 days.

(21) Appl. No.: 10/949,815

(22) Filed: Sep. 27, 2004

(65) Prior Publication Data

US 2006/0070227 A1 Apr. 6, 2006

(51) Int. Cl.
*H02K 15/00* (2006.01)
(52) U.S. Cl. .......................... 29/596; 29/598; 29/605; 29/606; 29/732; 310/260
(58) Field of Classification Search .......... 29/596–598, 29/605–609, 709, 732; 310/58–61, 52, 254, 310/270
See application file for complete search history.

(56) References Cited

U.S. PATENT DOCUMENTS

| 4,918,835 | A  | * | 4/1990  | Raschbichler et al. ........ 29/732 |
| 6,225,813 | B1 |   | 5/2001  | Garwatoski |
| 6,268,668 | B1 |   | 7/2001  | Jarczynski et al. |
| 6,631,335 | B2 | * | 10/2003 | Lusted et al. ................. 702/56 |
| 2006/0070227 | A1 | * | 4/2006 | Clough et al. ................ 29/596 |

FOREIGN PATENT DOCUMENTS

EP   1641106   * 3/2006

* cited by examiner

*Primary Examiner*—Minh Trinh
(74) *Attorney, Agent, or Firm*—Nixon & Vanderhye, PC

(57) ABSTRACT

The process for stator bar rewinds includes disassembly of the stator bars at the generator site, measurement of the stator bars, forwarding digital representations of the measurements to a manufacturing center and forming 3-Dimensional models of the stator bars requiring replacement and the stator. The stator bar 3D model is placed in the stator 3D model to insure accuracy of fit. Tooling and stator bar drawings are generated and sample stator bars are manufactured. 3D modeling of the manufactured sample stator bars are compared to the nominal 3D models to insure accuracy. The replacement stator bars are manufactured and forwarded in batches for assembly into the extant generator.

7 Claims, 5 Drawing Sheets

PROCESS FOR RAPID ON-DEMAND STATOR REWINDS IN ELECTRICAL GENERATORS

BACKGROUND OF THE INVENTION

The present invention relates to stator bar rewinds on extant electrical power producing land based generators and particularly relates to processes for on-demand stator bar rewinds independent of original equipment manufacturer to upgrade the quality and reliability of the stator bars in extant generators.

Land based electrical generators typically comprise a plurality of stator bars disposed in slots in a stator core. As well known, each stator bar is generally comprised of a plurality of individual electrically conductive strands. Each stator bar has opposite end sections which are twisted and extend in a generally circumferential conical direction. Each end section is connected, for example by brazing, to another stator bar to complete an electrical circuit in at least one phase about the stator. Sections of the stator bars intermediate the end sections are generally rigid and extend linearly. The ends of the stator bars, oftentimes called end windings, may index conically clockwise or counterclockwise as the ends extend from the stator core and twist from the linear intermediate section. The end windings define unique shapes at opposite ends of each stator bar for each different type of generator.

Over time it has been found desirable to replace existing stator windings in older generators with new stator windings that have a variety of qualitative and reliability enhancements. For example, older stator windings in existing generators frequently have asphalt or asbestos insulation which is low performing and may not be as effective as when new. As a consequence, many generator operators are desirous of replacing these older stator windings with new stator windings affording upgraded technology. While the present invention is applicable to stator rewinds, e.g. end winding support and slot structures, connection rings, etc., the terminology stator bars will be used for convenience throughout this specification and claims with the broader meaning of windings being attributable as applicable.

In the past, generator stator bar replacement has often been performed by the supplier of the original generator, i.e., the original equipment manufacturer (OEM). These suppliers normally maintain data from the supplied original equipment and thus have on hand measurements of the stator bars unique to that particular type of generator. Consequently, the original equipment manufacturer can readily supply replacement, stator bars. Non-OEM suppliers, however, are disadvantaged since data concerning the shape of the stator bars, essential to their replacement in that particular type of generator, is not available to them. Should the generator owner desire stator bar replacement from a non-OEM supplier, typically the owner would provide a measurement outage (in contrast to a scheduled outage) to permit the supplier to measure the existing stator bars and reverse engineer the shape of the stator bars. Non-scheduled measurement outages, however, can be costly to the owner and add cost to the non-OEM supplying the replacement stator bars.

Also the design, tooling, and fabrication of the new stator bars requires substantial time subsequent to the stator bar measurement phase adding further cost. For example, additional and necessary checking for the accuracy of the shape of the replacement stator bars per se as well as their fit with the existing stator are required before the replacement stator bars can be installed. Oftentimes, the time between measurement and installation can extend out to six months or more. In addition to the measurement outage and the added lead time, further costs associated with non-OEM suppliers for replacing stator bars are incurred in relation to the costs associated with replacement of stator bars by an OEM supplier. Consequently there is a need to reduce lead time and costs associated with the replacement of stator bars in existing generators such that cost effective stator bar rewinds independent of original equipment manufacturers can be effected.

BRIEF DESCRIPTION OF THE INVENTION

In a preferred embodiment of the present invention there is provided a process for rewinding stator bars for an electrical generator comprising the steps of (a) measuring the shape of at least one stator bar extant at the site of the generator;(b) generating a digital representation of the measured shape of the one stator bar;(c) fabricating a new stator bar using the digital representation to fabricate said new stator bar in substantial conformance to said digital representation; (d) generating a digital representation of the new stator bar;(e) generating a digital representation of the stator of the on-site generator; (f) comparing the digital representations of the new stator bar and the stator to determine the accuracy of fit of the respective digital representations of the stator and new stator bar; and (g) installing the fabricated new stator bar into the stator of the generator at the generator site.

DETAILED DESCRIPTION OF THE INVENTION

Figure 1:
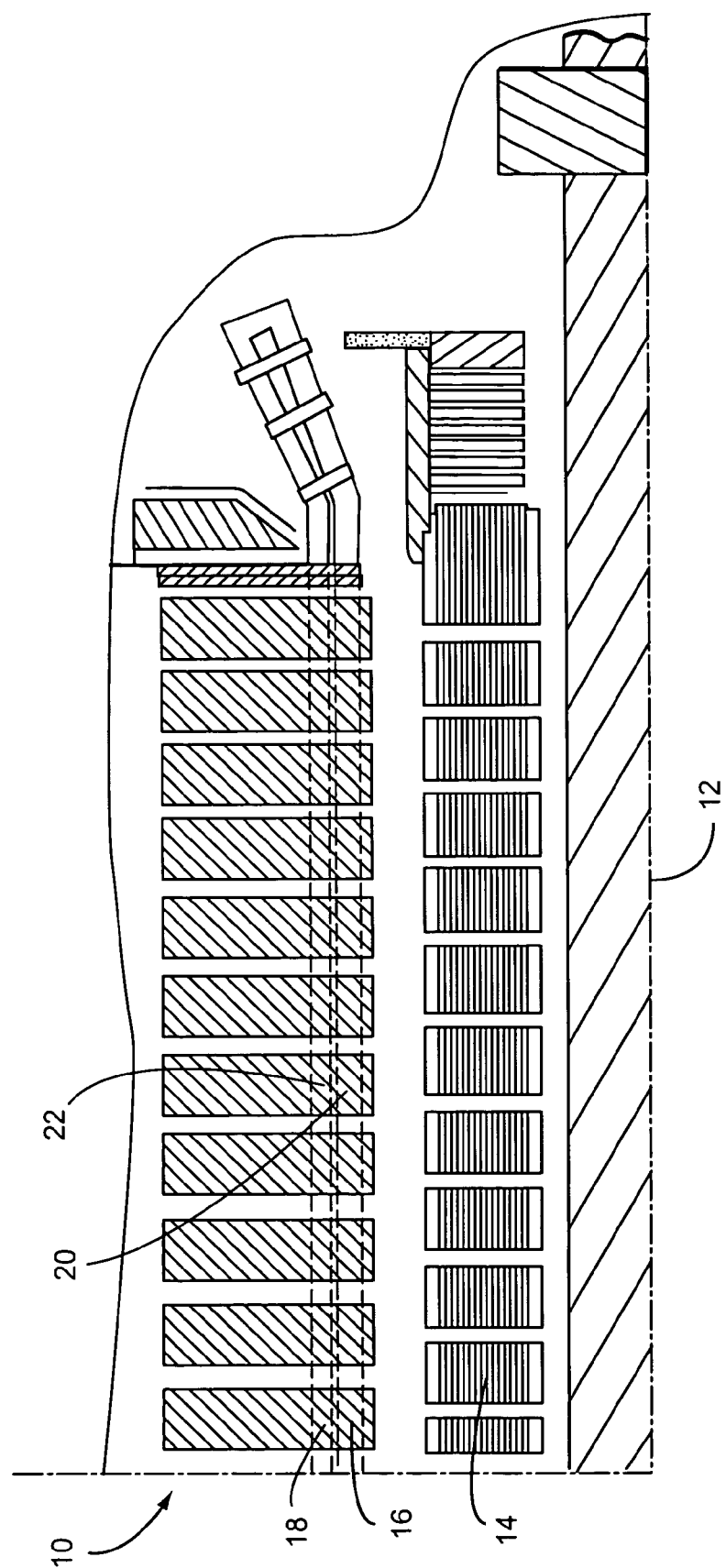
FIG. 1 is a schematic illustration of stator bars extending through a stator core of an electrical generator.
Figure 2:
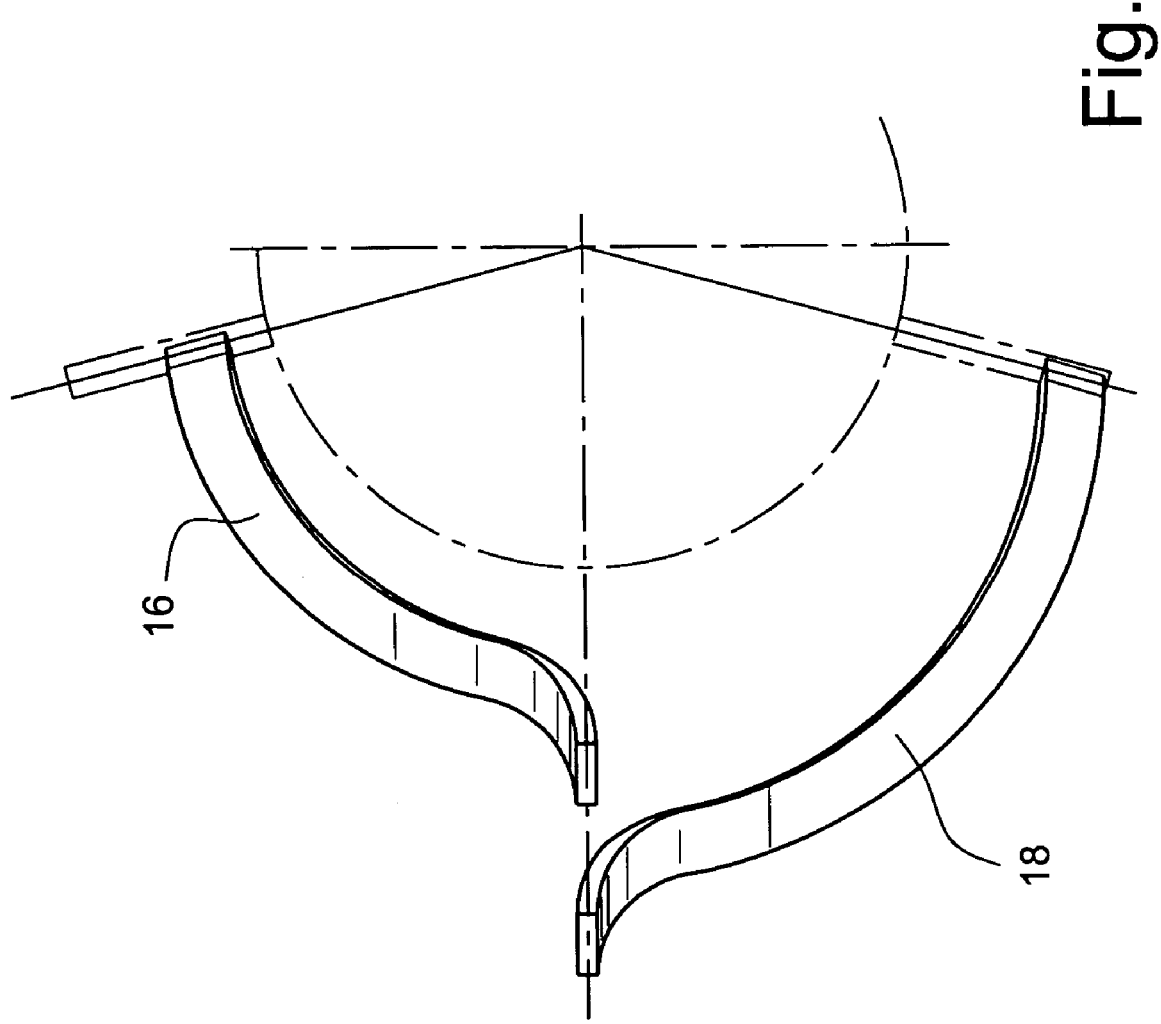
FIG. 2 is an end view of top and bottom stator bars projecting from the stator core illustrating their rotation and twist.

Referring now to FIG. 1, there is schematically illustrated a cross-section of one-half of a generator generally designated 10 having an axial center line 12 about which a rotor 14 rotates for generating electricity in a conventional manner. As illustrated, top and bottom stator bars 16,18, respectively, are disposed in stator core slots and include central sections 20,22, respectively, which extend generally linearly through the stator core. End sections of each stator bar emerging from the stator core extend in different directions as illustrated in FIG. 2 and are generally conical in shape and twisted. It will be appreciated that the end section of each stator bar is connected to an end section of another stator bar to complete an electrical circuit through the stator. Each stator bar is, as conventional, formed of a plurality of conductors, e.g., copper strands which are bound together, for example by binding bands and wrapped in insulation. In older generators, the insulation may be formed of asphalt or asbestos materials which are generally low performing materials and the replacement of the stator bars would, among other things, upgrade the insulation.

It will also be appreciated that each end section or end winding of each stator bar is different from one another for a particular type of generator. There are typically hundreds of stator bars within a single generator of a particular type, each having an end winding of unique shape having a generally conical configuration and a twist and which end sections extend in a conical clockwise or counterclockwise direction about the stator. Without data from the original stator bar supplier, it has been difficult for non-OEM suppliers of stator bars to provide stator bar rewinds in a high quality, cost effective manner to upgrade existing generators.

In order to reliably reproduce replacement stator bars in a cost effective manner an aspect of the present invention provides:

1. A portable measurement device that is transportable to an existing generator site and which has the capability of rapidly measuring the extant stator bars;
2. An automated 3D modeling tool that will take measured data from the measurement device and create a model affording a significantly sized sample of the stator bars;
3. A tooling data base containing key generator and stator bar characteristics enabling one or more manufacturing centers to identify whether tooling exists in the various stator bar manufacturing centers or requires new tooling;
4. A 3D analysis tool for comparing the nominal models of the stator bar as measured at the generator site and comparing the 3D models of manufactured replacement stator bars;
5. A universal and standard form for mounting various tools to define the replacement stator bar shapes during manufacturing; and
6. An automated tool for generating a virtual stator complete with binding bands, insulation and radial rings from a parametric model based on the nominal and actual bar measurements enabling the tool to perform a virtual comparison and verification with the modeled stator bar as placed in the virtual stator. This permits a comparison for fit, e.g. intrabar spacing, cross over spacing, strike clearances, lead alignment-verify single shot braze versus strand to strand and other parameters.

It will be appreciated that, in the course of providing rewinds, the original electrical and mechanical design will be reviewed to the extent possible and the latest and current electrical, mechanical and materials practices will be applied during the rewind process. Thus, the rewind will be as technologically updated as possible.

Figure 3:
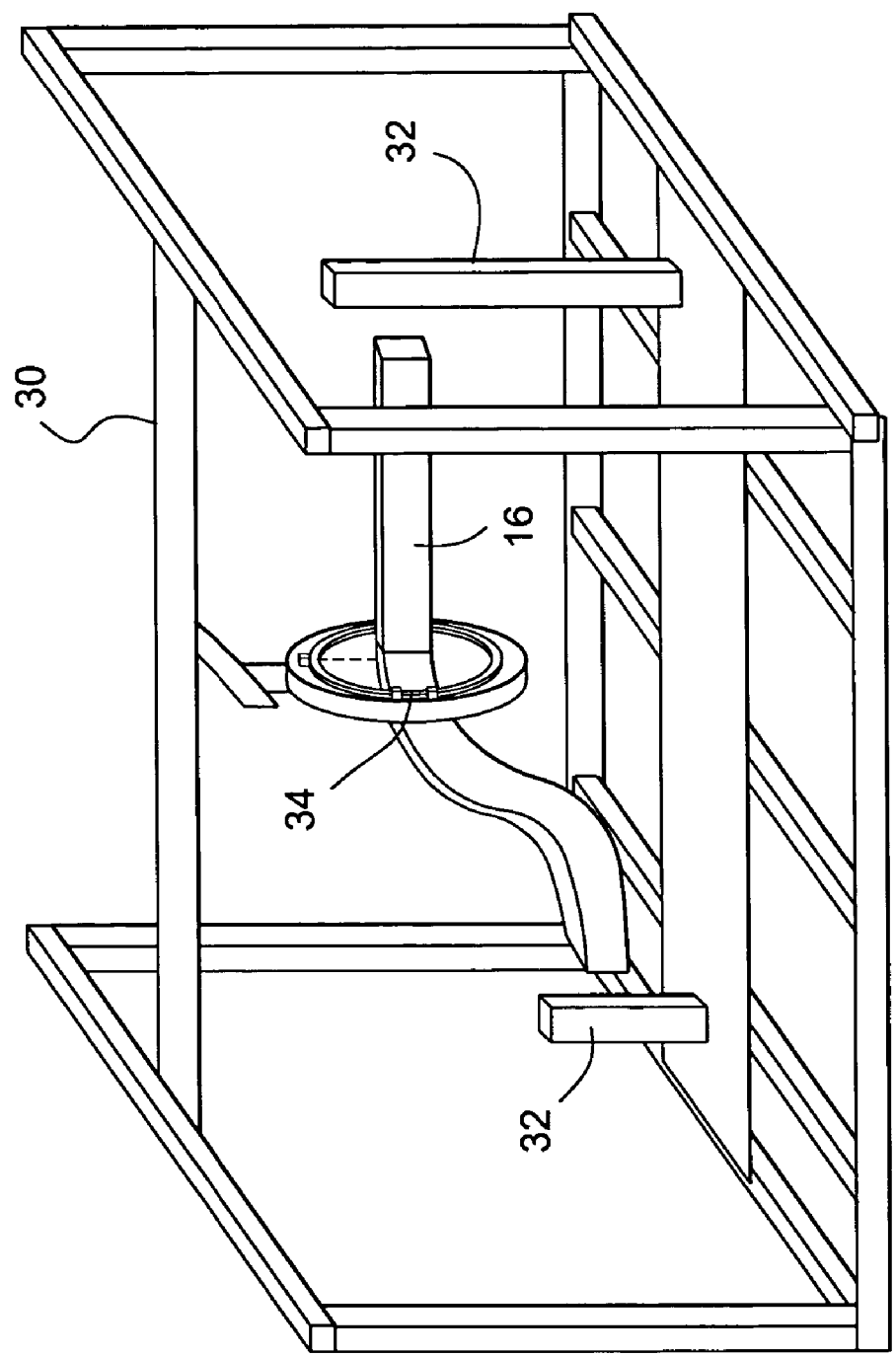
FIG. 3 is a schematic illustration of an on-site measuring device for measuring the configuration of stator bars removed from an existing generator.

Referring to FIG. 3, there is schematically illustrated a portable measurement device or skid 30 which can be brought to the site of the existing generator requiring a stator bar rewind. At the generator site, the stator bars are removed from the generator during a normal scheduled outage. The stator bars are prepared either by cutting the end arms off of a sample of the stator bars or measuring the entire stator bar from end to end. In FIG. 3, the stator bar, e.g. bar 16, is illustrated mounted between end supports 32 of the measurement skid. In lieu of the gantry style illustrated measurement device, the measurement device may comprise a small robotic arm mounting a laser sensor. In any event, the sensor 34 travels the length of the removed stator bar and digitizes the shape of the stator bars in three dimensions (3D). The rotation and twist of the stator bars are also measured. This measurement device may use existing auto programming technology for stator bar and coil robotic tape machines with reverse engineering to generate the measurement.

Figure 5:
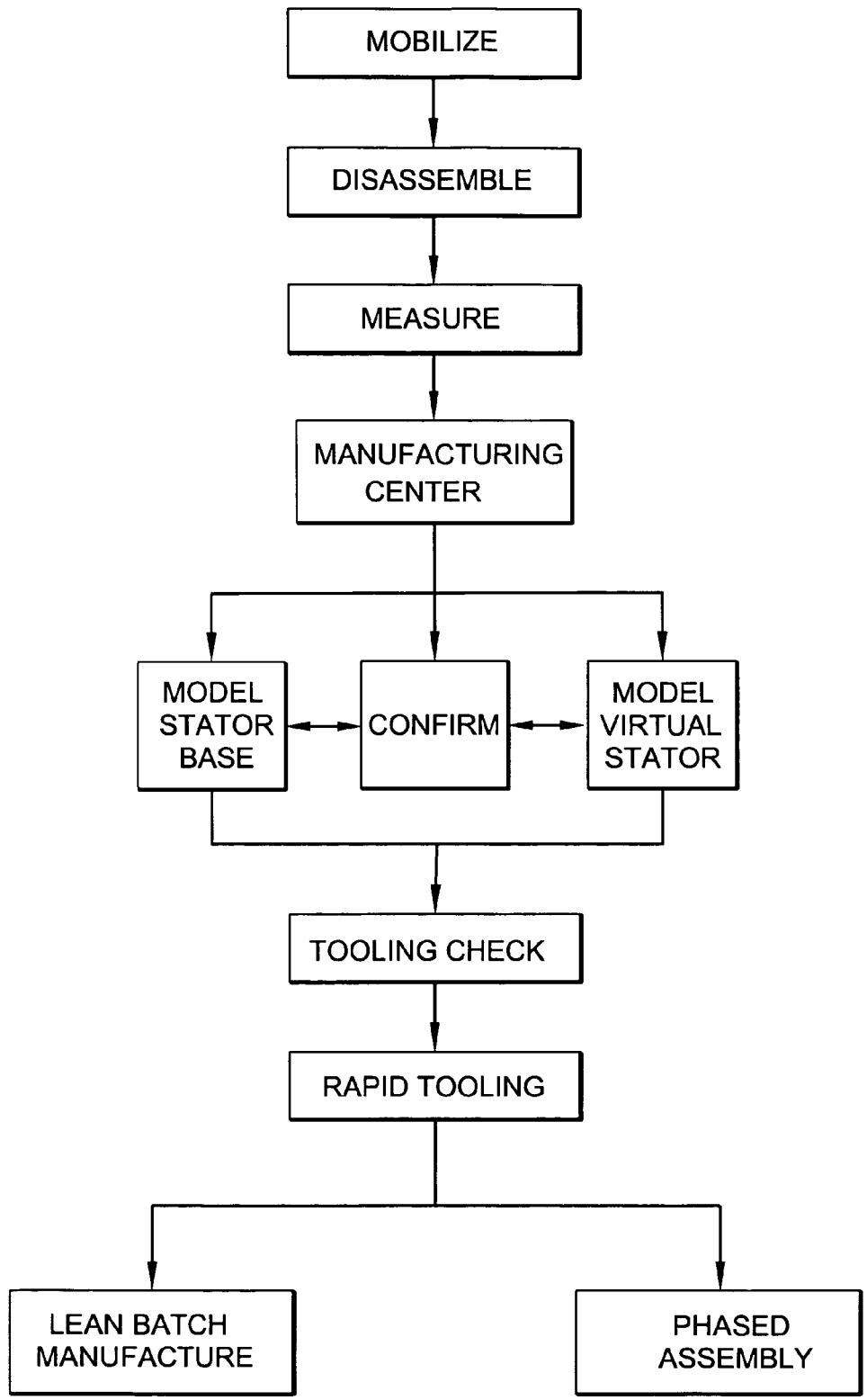
FIG. 5 is a block diagram illustrating a method of on demand stator rewinding in accordance with a preferred embodiment of the present invention.

As schematically represented in FIG. 5, the data file containing the measurements is forwarded electronically to one or more manufacturing facilities. At the manufacturing facility, the data file is used to create a 3D model of the stator bar using a conventional 3D modeling tool. The 3D modeling tool also may generate stator bar drawings and tool models for stator bar presses and end section forms. Consequently, the 3D modeling tool enables the data file received directly from the onsite measurement, the tape machine auto-programming file or directly from historical stator bar drawings to generate models at the stator bar, stator bar drawings and generate tooling models for 3D presses and end forms. During this phase, an existing tooling database is checked for preexisting tooling. If tooling is not readily available, the model is used to rapidly CNC press and form tooling e.g., from vendors local to the manufacturing center.

Figure 4:
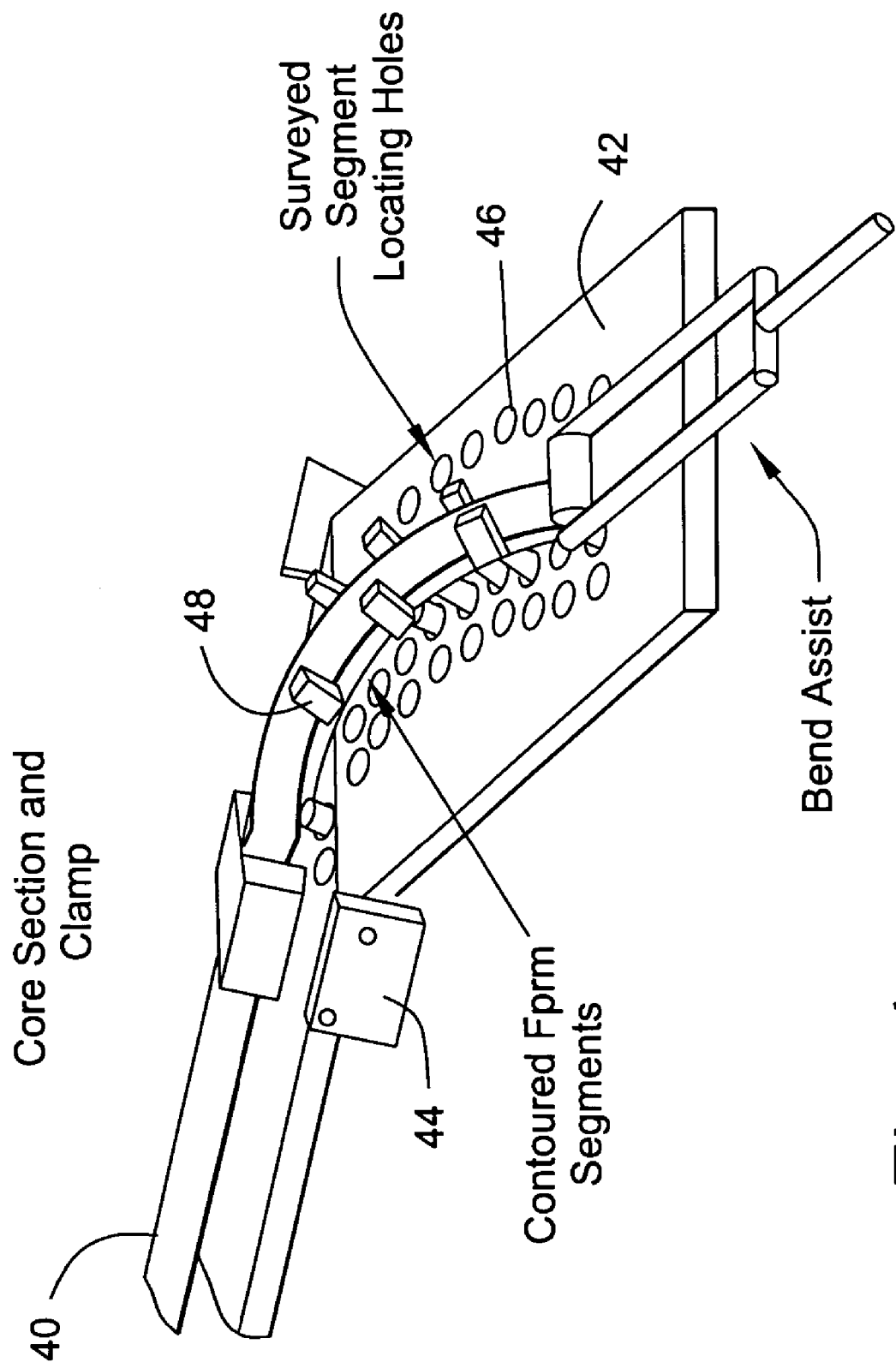
FIG. 4 is a schematic illustration of one end of a form for forming the ends of replacement stator bars.

For example, as illustrated in FIG. 4, a quick form is used to standardize the creation of forms among various manufacturing sites of an on demand stator rewind stator bar manufacturing network. A form may comprise an adjustable center or core section 40 and two adjustable end section fixtures on either end of the core section, only one of the end section fixtures 42 being illustrated. The core section has a clamp 44 at each end to secure the core section of the stator bar to the quick form. The end arm fixtures 42 have surveyed holes 46 that locate contoured segments that form shaping surfaces for the end section shape. The contoured segments 48 are machined and assigned survey holes using the 3D modeling tool and the stator bar model. The only continuous adjustment of the quick form is the core length. All other adjustments are discrete in order to maximize repeatability and minimize form variation between various manufacturing centers. The tooling data base is preserved in order to maximize recycled tooling and lessons learned from this particular rewind process for future use.

Sample bottom and top bars are then manufactured at one or more of the manufacturing centers. The bars as manufactured are then modeled, e.g., the data from the tape machine use to wrap the bars, is used to model the manufactured bars. That model data is then compared to nominal models of the measured stator bars removed from the extant generator in order to confirm model accuracy as illustrated in FIG. 5. Thus, any difference in the manufactured bar shape and the nominal or measured shape of the stator bar can be ascertained and the manufacturing process corrected as necessary.

The stator of the extant generator is also measured at the generator site and a 3D model is provided. The digital representations of the stator bars are then compared with the virtual stator, e.g., the 3D model of the stator bars as actually manufactured are electronically fitted in the virtual stator. Virtual slot support, binding bands and radial rings are added to correct the position of the stator bars in order to check intrabar spacing, cross over spacing, strike clearances, and lead alignment.

Once the initial batch of stator bars have been manufactured and checked for accuracy by the 3D modeling, an initial batch of stator bars are shipped to the generator site or in sequence as manufactured as illustrated in FIG. 5. This essentially corresponds assembly speed with stator bar replacement manufacturing speed and provides a phased assembly of the new replacement stator bars into the existing generator. The manufacturing facility continues to send batches of the manufactured replacement bars for immediate assembly including brazing the stator bar ends to one another and electrical testing. This phase ends with the rewind complete and the generator turned back over to the generator operator.

By using the foregoing described process, it will be appreciated that the prior necessary measurement outage is entirely eliminated and that the measurements can be made during scheduled outages. Also the tooling, manufacturing and checking phases of the process are substantially reduced in time enabling replacement stator bars to be installed in the existing generator in substantially similar time frames and cost as if the original equipment supplier was to replace the existing stator bars with replacement stator bars. The present process therefore enables on-demand replacement of stator bars in extant generators.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for rewinding stator bars for an electrical generator on site comprising the steps of
   (a) measuring the shape of at least one stator bar extant at the site of the generator;
   (b) generating a digital representation of the measured shape of the one stator bar;
   (c) fabricating a new stator bar using the digital representation to fabricate said new stator bar in substantial conformance to said digital representation;
   (d) generating a digital representation of the new stator bar;
   (e) generating a digital representation of the stator of the on-site generator;
   (f) comparing the digital representations of the new stator bar and the stator to determine the accuracy of fit of the respective digital representations of the stator and new stator bar; and
   (g) installing the fabricated new stator bar into the stator of the generator at the generator site.

2. The process according to claim 1 wherein step (a) includes digitizing the measurement of the one stator bar and generating a digital model of the measured stator bar.

3. The process according to claim 1 including fabricating tooling using the digital representation of the measured shape of the one stator bar as the basis for fabricating the tooling and step (c) includes using the fabricated tooling to fabricate the new stator bar.

4. The process according to claim 1 including maintaining a tooling database containing digital representations of pre-existing tooling for the fabrication of stator bars, generating a digital representation of tooling using the digital representation of the measured shape of the one stator bar, and comparing the tooling database with the digital representation of the tooling to ascertain the availability of existing tooling for the fabrication of the new stator bar.

5. The process according to claim 1 including comparing the digital representations of the measured shape of the one stator bar and the new stator bar to determine the accuracy of conformance between the new stator bar and the one stator bar as represented by the digital representations of the measured shape of the one stator bar and the new stator bar.

6. The process according to claim 1 including measuring the shape of a second stator bar extant at the site of the generator, generating a digital representation of the measured shape of the second stator bar, fabricating a second new stator bar using the digital representation of the measured shape of the second stator bar, generating a digital representation of the second new stator bar and comparing the digital representations of the second new stator bar and the stator to determine the accuracy of fit of the respective digital representations of the second stator bar and the stator.

7. The process according to claim 6 including comparing the digital representations of the measured shape of the second stator bar and the second new stator bar to determine the accuracy of conformances between the second new stator bar and the second stator bar as represented by the digital representations of the measured shape of the second stator bar and the second new stator bar.

* * * * *